United States Patent [19]

Andersson

[11] Patent Number: 4,976,671
[45] Date of Patent: Dec. 11, 1990

[54] RANGE GEARBOX FOR MOTOR VEHICLES

[75] Inventor: Sven Andersson, Floda, Sweden

[73] Assignee: AB Volvo, Gothenburg, Sweden

[21] Appl. No.: 501,905

[22] Filed: Jun. 7, 1983

[30] Foreign Application Priority Data

Jun. 7, 1982 [SE] Sweden ................................ 8203512

[51] Int. Cl.⁵ .............................................. F16H 3/44
[52] U.S. Cl. .................................................. 475/299
[58] Field of Search ............... 74/785, 740; 192/18 R; 475/299

[56] References Cited

U.S. PATENT DOCUMENTS

| | | | |
|---|---|---|---|
| 1,644,065 | 10/1927 | Lanquetin | 74/785 |
| 1,909,330 | 5/1933 | Banker | 74/785 X |
| 2,331,684 | 10/1943 | Henningsen | 74/785 X |
| 2,663,199 | 12/1953 | Harrison | 74/740 X |
| 3,230,796 | 1/1966 | Thomson | 192/18 R X |
| 4,063,470 | 12/1977 | Kelbel | 74/785 |
| 4,404,869 | 9/1983 | Numazawa et al. | 74/740 |
| 4,440,042 | 4/1984 | Holdeman | 74/785 |
| 4,667,538 | 5/1987 | Larsson | 74/740 X |

FOREIGN PATENT DOCUMENTS

| | | |
|---|---|---|
| 2059351 | 6/1971 | Fed. Rep. of Germany . |
| 2102547 | 8/1971 | Fed. Rep. of Germany . |
| 2055087 | 5/1972 | Fed. Rep. of Germany . |
| 2238976 | 2/1974 | Fed. Rep. of Germany ........ 74/740 |
| 1072143 | 9/1954 | France ................................ 74/785 |
| 1555576 | 1/1969 | France . |
| 2385945 | 10/1978 | France . |
| 0914843 | 3/1982 | U.S.S.R. ................................ 74/785 |
| 475328 | 11/1937 | United Kingdom . |
| 1183801 | 3/1970 | United Kingdom . |
| 1555680 | 11/1979 | United Kingdom . |

*Primary Examiner*—Dirk Wright
*Attorney, Agent, or Firm*—Young & Thompson

[57] ABSTRACT

The invention relates to a range gearbox of planetary type, designed to be attached to a vehicle gearbox, a so-called base gearbox. The annulus or gear ring of the planetary gear set is non-rotatably joined to a shift sleeve, through which the annulus can be locked either to a coupling ring securely joined to the front housing end wall of the range gearbox, or to a coupling ring which is non-rotatably mounted on the input shaft of the range gearbox. The shift sleeve serves as an annulus carrier and displaces the annulus axially during the shift movement.

1 Claim, 1 Drawing Sheet

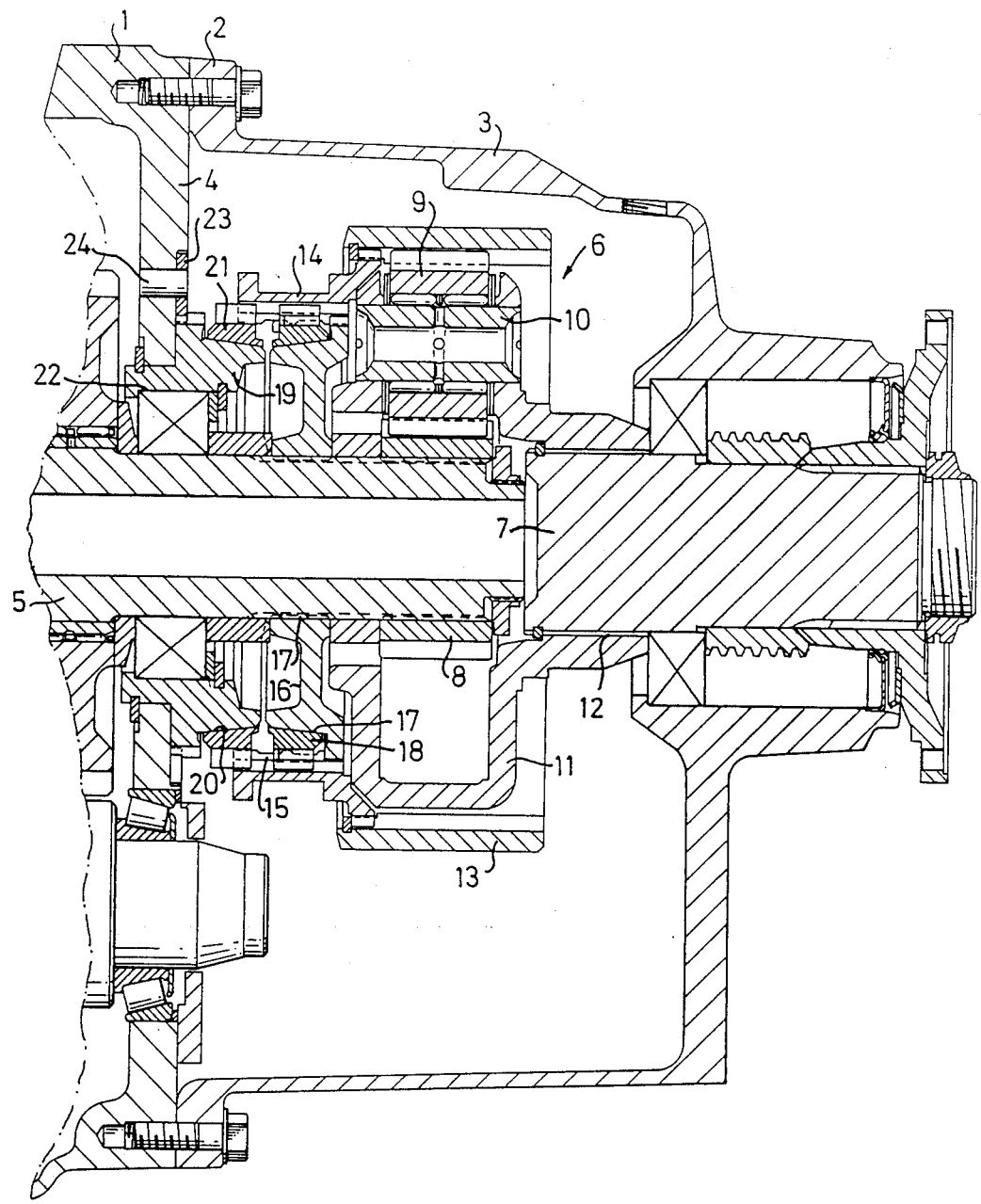

RANGE GEARBOX FOR MOTOR VEHICLES

The present invention relates to a range gearbox for motor vehicles designed to be attached to the output side of a base gearbox and comprising a planetary gear set enclosed in a housing, with a sun gear mounted on an input shaft and engaging planet gears which are carried by a planet carrier joined to an output shaft and which engage an annulus, which by means of coupling means can be locked either against rotation relative to said housing to establish a reduction ratio drive between the input shaft and the output shaft, or against rotation relative to the shafts to establish direct drive between the shafts.

Vehicle transmissions consisting of a base gearbox and a range gearbox coupled to the output side thereof are quite common in heavy trucks in particular, in order to provide a large number of gear ratios and to make it possible to keep the engine speed within a favourable range while driving at various speeds and loads. A total of eight gear speeds are provided with a four-speed base gearbox and a two-speed range gearbox.

In a known design of a range gearbox of the type described by way of introduction, the annulus or ring gear is joined to an annulus carrier, which is rotatably mounted on the output shaft. To engage the low range, a shift sleeve, axially displaceable but non-rotatable relative to the annulus carrier, is displaced into engagement with a coupling ring fixed on an intermediate disc rigidly fixed to the range gearbox housing. Engagement of the high range, i.e. direct drive, is accomplished by bringing the shift sleeve into engagement with a coupling ring fixed to the output shaft.

When dimensioning the housing of the range gearbox just described, it must be taken into account that the housing is subjected to torque when the annulus is locked to the intermediate disc when driving in the low range mode. One must also take into account the heavy load to which the planetary gear set is subjected due to the twisting moment arising between the planet gear carrier and the annulus when in the high range mode. The twisting moment is transmitted via the planetary gear carrier, the output shaft, the coupling ring, the shift sleeve and the annulus carrier back to the annulus and its size is dependent on the ratio between the radii of the sun gear and the annulus. In a practical embodiment with a gear ratio of 1:3-1:4 the twisting moment amounts to 2-3 times the input torque.

The purpose of the present invention is to achieve a range gearbox of the type described in the introduction, which is subjected to lower loads than the above described known range gearbox at the same time as it is compact and can be manufactured so that no torque is transmitted to its housing.

This is achieved by virtue of the fact that the annulus is non-rotatably joined to a shifting sleeve serving as an annulus carrier and arranged concentric with the input shaft, said shifting sleeve being axially displaceable between a first shift position in which it establishes a non-rotational coupling between the annulus and the input shaft, and a second shift position in which it establishes a non-rotational coupling between the annulus and a housing portion on the input side.

This avoids the problem of twisting moment when operating in the high range mode and the load on the torque-transmitting portions of the range gearbox, such as planet carrier, its connection to the output shaft, the connection of the shift means to the shaft and the shift means themselves, will, during operation in the high range, be significantly lower than in the previously known design. With a gear ratio within the above-mentioned interval, the load on said torque transmitting parts will for example only be about 30% of the load on the corresponding parts in a conventional range gearbox. High transient loads are common particularly in the high range. By fixing the annulus to a housing end wall on the input side of the gearbox when operating at low range, the above-mentioned intermediate disc can be eliminated. The housing end wall can with advantage be identical with the rear end wall of the base gearbox, so that no torque is transmitted to the range gearbox housing, which can therefore be made thinner and/or be made in another material than cast iron, e.g. aluminum.

The invention will be described in more detail with reference to an example shown in the accompanying drawing, which shows a longitudinal section through a range gearbox connected to a base gearbox.

In the FIGURE, 1 designates the rear portion of the housing in a base gearbox, to which a flange 2 on an open-front housing 3 of a range gearbox is bolted. The rear end wall 4 of the housing 1 thus at the same time forms the front end wall of the range gearbox housing 3. The base gearbox has an output shaft 5 which extends into the range gearbox housing 3 and forms the input shaft of the range gear set, which is coupled via a planetary gear set (generally designated 6) to an output shaft 7 with a flange for connection to the propeller shaft of the vehicle.

The planetary gear set 6 comprises a sun gear 8 securely fixed to the input shaft 5, and engaging planet gears 9 which are mounted on spindles 10 carried by a planet carrier 11, which is in turn splined 12 to the output shaft 7. The planet gears 9 engage an annulus or ring gear 13 which is securely fixed to a shift sleeve 14 which is axially displaceable by means of a shifting fork (not shown) coupled to the vehicle shift mechanism.

The shift sleeve 14 has internal coupling teeth 15 which in the position shown in the FIGURE engage corresponding teeth on a coupling ring 16 which is non-rotatably splined 25 to the input shaft. The coupling ring 16 has a synchronizing cone 17 which supports a synchronizing ring 18 in engagement with the teeth 15 of the shift sleeve 14. A corresponding toothed coupling ring 19 with synchronizing cone 20 supporting a synchronizing ring 21 is fixed to the rear end wall 4 of the base gearbox and also serves as a bearing seat for the front shaft bearing 22 of the range gear set. The coupling ring 19 is fixed against rotation by means of an annular toothed locking member 23, which is fixed by means of pins 24 to the end wall 4 and having teeth which engage the teeth of the coupling ring 19.

In the position of the shift sleeve 14 shown in the FIGURE, the ring gear 13 is locked against rotation relative to the input shaft by the teeth 15 of the sleeve 14 being engaged with the teeth of the coupling ring 16. Thus the planetary gear set is locked and there is direct drive between the input and the output shafts. When the shift sleeve 14 is displaced, and with it the annulus 13 as well, to the left from the position shown in the FIGURE, the sleeve is first disengaged from the coupling ring 16. Under the effect of the synchronizing ring 21, the sleeve 14 and the annulus 13 are braked, whereafter the teeth 15 of the sleeve 14 are brought into engagement with the teeth of the ring 19, thus locking the annulus 13 to the rear end wall 4. The lower range of the range set is now engaged and the input shaft rotates at a higher speed depending on the reduction ratio of the gear set.

In addition to the advantages discussed above, the invention also has the advantage that the range gear set can be made of fewer parts. By placing the shift means between the end wall of the base gearbox and the planetary gear set itself, it is possible to eliminate not only the previously mentioned intermediate disc but also such parts as the annulus carrier with bearings and guide sleeve, since the annulus can be joined directly to the shift sleeve.

I claim:

1. Vehicle transmission, especially for heavy trucks, comprising a base gearbox and a two-mode range gearbox of planetary gear type, both gearboxes having housings that are secured to each other and the base gearbox having an end wall facing the range gearbox, the base gearbox having a driven shaft that emerges from said end wall and serves as an input shaft of said range gearbox, said range gearbox having an output shaft, said input shaft carrying a sun gear which engages planet gears, which are carried by a planet gear carrier joined to said output shaft of the range gearbox and which engages an annulus, which can be locked by shift means either against rotation relative to said housings to establish reduction ratio drive between said shafts or against rotation relative to the shafts to establish direct drive between the shafts, characterized in that the annulus is rigidly joined to a shifting sleeve serving an an annulus carrier and arranged concentric with said input shaft, said shifting sleeve being axially displaceable between a first shift position in which it establishes a non-rotational coupling between the annulus and the said input shaft, and a second shift position in which it fixes the annulus to said base gearbox end wall facing the range gearbox.

* * * * *